340-870.14 SR
XR 3,199,081
CROSS REFERENCE [redacted]
230
1

CIRCUIT ARRANGEMENT FOR GIVING PERMISSION TO TRANSMIT TO ONE OF A NUMBER OF SOURCES OF INFORMATION ACCORDING TO A FIXED PRIORITY

Filed March 6, 1961 6 Sheets-Sheet 1

INVENTOR
HANS KOK.
FOLUTIANUS TH.A.VAN BERGEN.
BY Frank R. Jifani
AGENT

INVENTOR
HANS KOK
FOLUTIANUS TH.A.VAN BERGEN.
BY [signature]
AGENT

INVENTOR
HANS KOK.
FOLUTIANUS TH.A.VAN BERGEN.
BY
Frank R. Jufani
AGENT

INVENTOR
HANS KOK.
FOLUTIANUS TH. A. VAN BERGEN.
BY
AGENT

CIRCUIT ARRANGEMENT FOR GIVING PERMISSION TO TRANSMIT TO ONE OF A NUMBER OF SOURCES OF INFORMATION ACCORDING TO A FIXED PRIORITY

Filed March 6, 1961

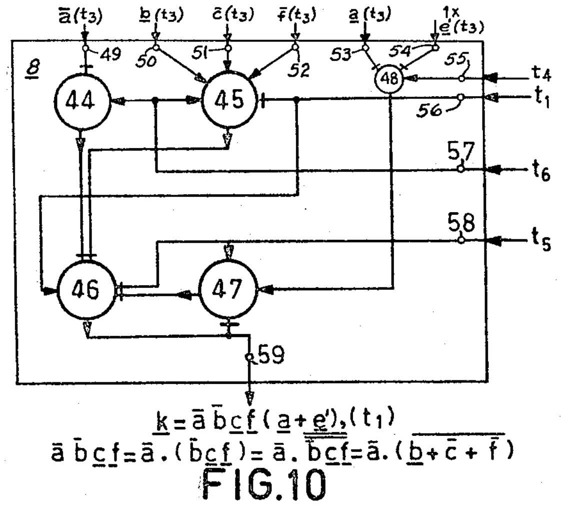

$\underline{k} = \bar{a}\,\bar{b}\underline{c}\underline{f}\,(\underline{a}+\underline{e}'),(t_1)$ $\bar{a}\,b\underline{c}\underline{f} = \bar{a}.(\bar{b}\underline{c}\underline{f}) = \bar{a}.\,\overline{b\underline{c}\underline{f}} = \bar{a}.(\underline{b}+\bar{c}+\bar{f})$

FIG.10

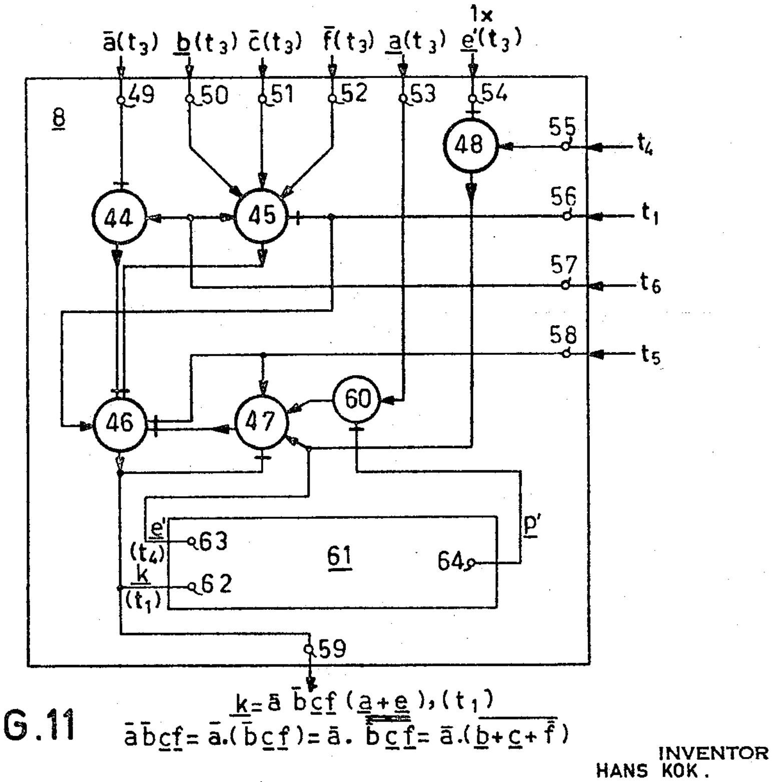

$\underline{k} = \bar{a}\,\bar{b}\underline{c}\underline{f}\,(\underline{a}+\underline{e}),(t_1)$

FIG.11

$\bar{a}\bar{b}\underline{c}\underline{f} = \bar{a}.(\bar{b}\underline{c}\underline{f}) = \bar{a}.\,\overline{b\underline{c}\underline{f}} = \bar{a}.(\underline{b}+\underline{c}+\bar{f})$ INVENTOR
HANS KOK.
FOLUTIANUS TH. A. VAN BERGEN.
BY Frank R. Jifari
AGENT INVENTOR
HANS KOK.
FOLUTIANUS TH.A.VAN BERGEN.
BY Frank R. Trifari
AGENT United States Patent Office 3,199,081

Patented Aug. 3, 1965

3,199,081

CIRCUIT ARRANGEMENT FOR GIVING PERMISSION TO TRANSMIT TO ONE OF A NUMBER OF SOURCES OF INFORMATION ACCORDING TO A FIXED PRIORITY

Hans Kok and Folutianus Theodorus Antonius van Bergen, Hilversum, Netherlands, assignors to North American Philips Company, Inc., New York, N.Y., a corporation of Delaware Filed Mar. 6, 1961, Ser. No. 93,557
Claims priority, application Netherlands, Mar. 7, 1960, 249,158
5 Claims. (Cl. 340—147)

The invention relates to a circuit arrangement for selectively permitting the transmission of information by one of a number of signal sources or sources of information according to a fixed priority. Each source of information has at least one control signal output, at which a control signal is produced which indicates whether the information source concerned contains information to be transmitted, and a control signal input for receiving a control signal which permits this information source to transmit information stored in it by bringing this source to the state in which information stored therein is transmitted. Such a circuit arrangement may be required in automatic telegraph systems. The sources of information may be incoming lines or memories. However, it may be necessary to give different priorities to the different information sources so that, when two sources of information state simultaneously that they contain information to be transmitted, only the source having the higher priority is permitted to transmit information. It may even be desirable for the transmission by an information source having lower priority to be interrupted when an information source having higher priority states that it contains information to be transmitted. This interruption of the transmission by an information source of lower priority because an information source of higher priority states that it has information to be transmitted, may take place either at the end of a completed quantity of information, for example at the end of a telegram, or immediately, that is to say, in the middle of a telegram. According to the invention, the control signal permitting a source of information to transmit is produced by a logical circuit, the output terminal of which is connected to the control signal input of the information source concerned and the control terminals of which are connected to control signal outputs of the information sources having higher priority than the information source concerned and to a control signal output of this information source. Each logical circuit is arranged so that it can provide an output signal permitting the information source concerned to transmit only if each information source of higher priority delivers the control signal indicating that this information source contains no information to be transmitted and the information source concerned itself delivers the control signal indicating that this information source contains information to be transmitted.

Two embodiments of the invention will now be described by way of example with reference to the drawing.

FIGURES 7, 8, 9, 10, 11 and 12 are circuit arrangements of embodiments of component parts of a circuit arrangement in accordance with the invention.

Figure 1:
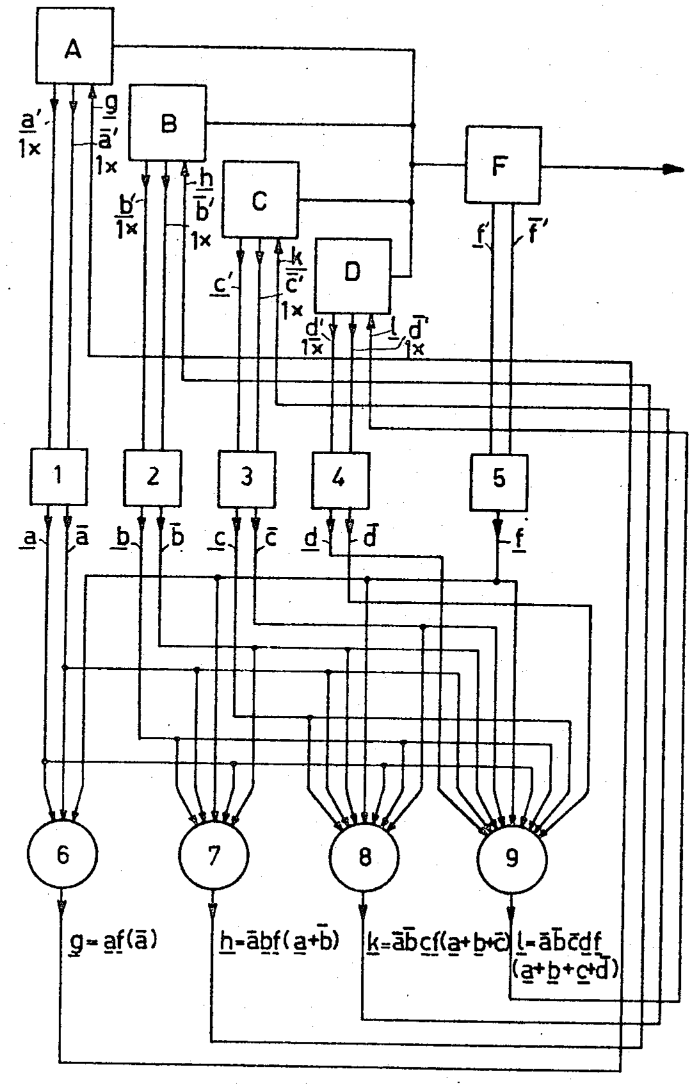
FIGURES 1 and 2 are block-schematic diagrams of two embodiments of the invention.

In FIGURE 1, information sources A, B, C and D have outputs connected to the input of a transmitting device F an output of which is connected to an outgoing line.

Each information source A, B, C and D has two control signal outputs and one control signal input. The two control signal outputs of the information source A deliver, for example, signals $a'$ and $\overline{a}'$, and the control signal input of this information source receives a signal $g$. The presence of the signal $a'$ means that the information source A contains information to be transmitted, while the presence of the signal $\overline{a}'$ means that the information source A contains no information to be transmitted. Thus, the signals $a'$ and $\overline{a}'$ are the negations of each other and are never present simultaneously. The signal $g$ is the signal permitting the information source A to transmit information stored in it. Letters $b'$ and $h$, $c'$ and $k$, $d'$ and $l$ have similar meanings with respect to the sources of information B, C and D, respectively. In FIGURE 1, it is assumed that the signals $a'$, $\overline{a}'$, $b'$, $\overline{b}'$, $c'$, $\overline{c}'$, $d'$, $\overline{d}'$ are non-recurrent pulses whereas the signals $g$, $h$, $k$, $l$ are pulse trains. The signals $a'$ and $\overline{a}'$ are fed to a circuit 1 which converts them to pulse trains. Hence, the circuit 1 is made so that when it receives a non-recurrent pulse $a'$, it delivers a pulse train $a$, whereas if it subsequently receives a non-recurrent pulse $\overline{a}'$, the pulse train $a$ is broken off and a pulse train $\overline{a}$ is delivered. Circuits 2, 3 and 4 have similar functions relative to the non-recurrent pulses $b'$ and $\overline{b}'$, $c'$ and $\overline{c}'$, $d'$ and $\overline{d}'$, respectively. The transmitting device F has two control signal outputs delivering signals $f'$ and $\overline{f}'$. The signal $f'$ carries the information that the device F is free and the signal $\overline{f}'$ carries the information that the transmission circuit F is busy. These signals are also assumed to be non-recurrent pulses. In a circuit 5, a non-recurrent pulse $f'$ is converted to a pulse train $f$ and the occurrence of a non-recurrent pulse $\overline{f}'$ causes the pulse train $f$ delivered by the circuit 5 to be broken off. Obviously, the circuits 1, 2, 3, 4 and 5 can be omitted if the members A, B, C, D and F themselves deliver pulse trains. Finally, the circuit arrangement includes four logical circuits 6, 7, 8 and 9 which act substantially as "and" gates provided with inhibition. The logical gate 6 receives the pulse trains $a$ and $\overline{a}$ from the circuit 1 and the pulse train $f$ from the circuit 5. The logical circuit 6 is designed so that it delivers a pulse train $g$ if it simultaneously receives a pulse of the pulse train $a$ and a pulse of the pulse train $f$. However, this pulse train $g$ persists after either of the two pulse trains $a$ and $f$ (in particular the pulse train $f$) has ceased. The logical circuit 6 further is designed so that the pulse train $g$ is immediately broken off when it receives the pulse train $\overline{a}$. The reason why the circuit 6 has to possess these properties will be described more fully hereinafter. The function of the logical circuit 6 is indicated symbolically in FIGURE 1 by the formula $$g=af(\overline{a})$$

The logical circuit 7 receives the pulse trains $\overline{a}$, $b$ and $f$ from the circuits 1, 2 and 5 and also the pulse trains $a$ and $\overline{b}$ from the circuits 1 and 2. The circuit 7 is designed so that it delivers the pulse train $h$ if it simultaneously receives pulses of the pulse trains $\overline{a}$, $b$ and $f$, and this pulse train $h$ persists if one of the pulse trains $\overline{a}$, $b$ and $f$ ceases (in particular when the pulse train $f$ ceases). The circuit 7 is furthermore designed so that the pulse train $h$ ceases immediately when it receives the pulse train $a$ from the circuit 1 or the pulse train $\overline{b}$ from the circuit 2. This is indicated in FIGURE 1 by the formula $$h=\overline{a}bf(a+\overline{b})$$

The functions of the logical circuits 8 and 9 are similarly indicated in FIGURE 1 by formulae. Each of the signal sources A, B, C and D further transmits information only as long as it receives the relevant pulse train $g$, $h$, $k$ or $l$, and breaks off its transmission as soon as this pulse train ceases.

The circuit arrangement shown in FIGURE 1 operates as follows. It is assumed that at a certain instant the source of information A contains information to be transmitted while at that instant none of the remaining sources of information B, C or D is transmitting information. Hence, the transmitter F is free at this instant. The logical circuit 6 receives pulse trains *a* and *f* and consequently begins to transmit the pulse train *g* so that the information source A is permitted to transmit the information stored in it. However, as soon as the information source A begins to transmit information, the transmitter F is seized and the pulse train *f* disappears. As has been mentioned hereinbefore, this does not break off the transmission of the pulse train *g*.

If at the instant at which the information source A states that it contains information to be transmitted, one of the remaining information sources B, C or D, for example the source of information C, is transmitting information, the transmitter F is busy at this instant so that the circuit 6 does not receive the pulse train *f* and hence does not deliver the pulse train *g* either. The circuit 8, however, receives the pulse train *a* from the circuit 1 so that the pulse train *k* is broken off and the information source C ceases transmitting information. As a result, the transmitter F becomes free so that the circuit 6 receives the pulse train *f*. Since this logical circuit now simultaneously receives the pulse trains *a* and *f*, it begins to transmit the pulse train *g*. This latter pulse train permits the source of information A to transmit the information stored so that the transmitter F is again seized. The resulting disappearance of the pulse train *f*, however, does not interfere with the persistence of the pulse train *g*. Thus, it will be appreciated that the signal source A has priority to the signal source C and that the transmission of information by the signal source C is immediately broken off when the information source A states that it contains information to be transmitted. It is also readily verifiable that, if the information sources A and C simultaneously state that they contain information to be transmitted, solely the information source A is given permission to transmit information. Thus, in the circuit arrangement shown in FIGURE 1 the information source A has priority to the information sources B, C and D, the information source B has priority to the information sources C and D, and the information source C has priority to the information source D. Furthermore, a signal *g, h, k* or *l* giving permission to transmit immediately ceases when the information source concerned has transmitted all the information stored in it, since the logical circuit concerned in this event receives the signal $\bar{a}$, $\bar{b}$, $\bar{c}$ or $\bar{d}$. Consequently, the circuit arrangement shown in FIGURE 1 contains all the properties required of a priority circuit.

Figure 2:
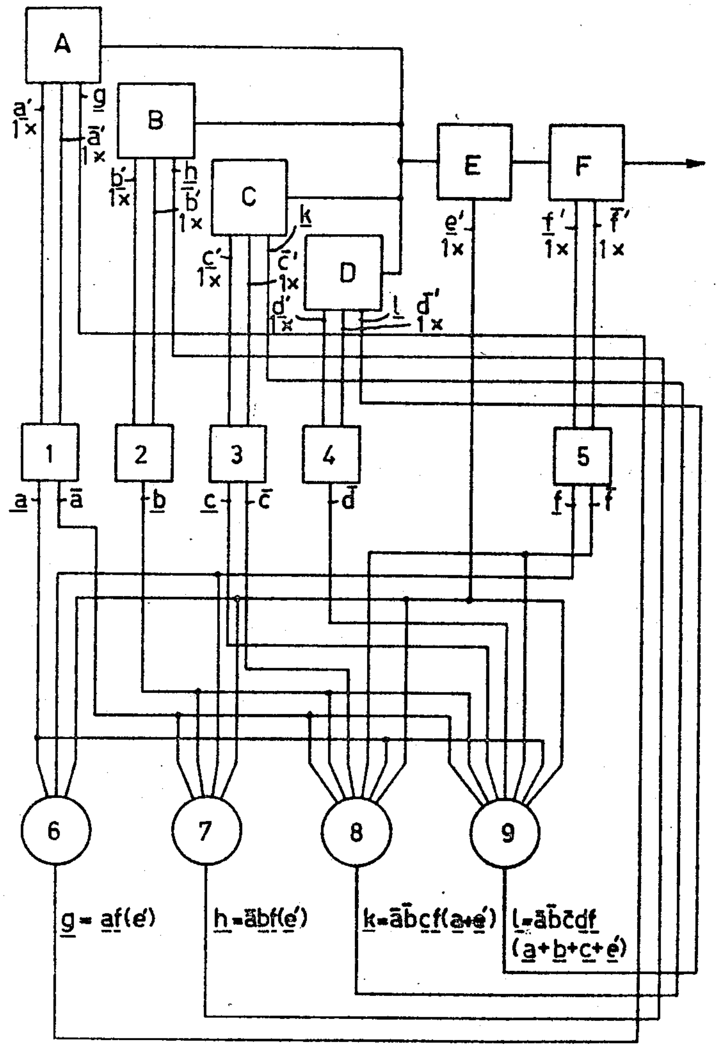

FIGURE 2 shows the block-schematic diagram of another embodiment of the invention. The circuit arrangement shown in FIGURE 2 is distinguished from that shown in FIGURE 1 by the provision of a circuit E between the sources of information A, B, C, D and the transmitter F. This circuit E delivers a control signal *e'* in the form of a non-recurrent pulse whenever one of the sources of information A, B, C or D has transmitted a certain quantity of information, for example a complete telegram. It is assumed, for example, that the circuit arrangement is intended for the transmission or retransmission of telegrams the characters of which correspond with certain code groups. The arrangements then may be such that each telegram terminates in a certain code group which carries the information that a complete telegram has been transmitted. Hence, the circuit E has to be capable of detecting this code group and to deliver a non-recurrent pulse *e'* on detection of such a code group. Such circuits detecting a certain code group are known already in telegraphy so that the description of an embodiment can be dispensed with. A second difference from the circuit arrangement shown in FIGURE 1 consists in that the transmission of the pulse train *g* by the logical circuit 6 now is not broken off by a pulse the presence of the pulse train $\bar{a}$ but by the reception of a pulse *e'*. The pulse train *h* is broken off not by the reception of one of the signals *a* or $\bar{b}$ but by the reception of a pulse *e'*. The pulse train *k* is interrupted either by the reception of a pulse train *a* or by the reception of a pulse *e'*. The pulse train *e* is broken off either by the reception of one of the pulse trains *a*, *b* or *c* or by the reception of a pulse *e'*.

The circuit arrangement shown in FIGURE 2 operates as follows. It is assumed that at a certain instant the source of information A states that it contains information to be transmitted and at that instant the information source B is transmitting information. Thus, the transmitter F is busy at this instant so that the circuit 6 does not receive the pulse train *f* and consequently does not immediately commence to transmit the pulse train *g*. Hence, the information source B continues transmitting information. At a certain instant, however, the end of a given quantity of information (for example of a telegram) is reached and this is detected by the circuit E. This circuit as a result delivers a pulse *e'* so that the pulse train *h* is broken off and the source of information B can no longer transmit information. The transmitter F now becomes free so that the circuit 6 simultaneously receives the pulse trains *a* and *f* and hence begins to transmit the pulse train *g*. This latter pulse train gives permission to the information source A to transmit the information stored in it. The information source A thus has priority to the information source B, however, this priority is lower than in the circuit arrangement shown in FIGURE 1, because the transmission of information by the source of information B is not interrupted for the sake of a transmission of information by the source of information A before the source of information B has reached the end of a given quantity of information, for example a telegram. Since the pulse trains *k* and *l* are broken off by the reception of the pulse train *a*, the transmission of information by one of the sources of information C or D is immediately stopped when the information source A states that it contains information to be transmitted. Consequently, one might say that the source of information A has a weak priority to the information source B but a strong priority to the information sources C and D. It can readily be ascertained that the information source B has weak priority to the information source C and a strong priority to the information source D, whilst the source of information C has a strong priority to the information source D.

Figures 3, 4, 5:
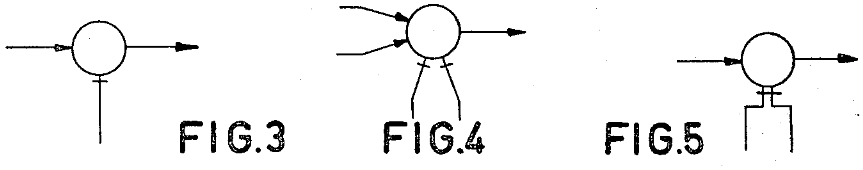
FIGURES 3 to 5 show the symbols of units from which elements of a circuit arrangement in accordance with the invention can be built.

FIGURE 3 shows the symbol used herein for units from which the component parts of a circuit arrangement as shown in FIGURE 1 or FIGURE 2 may be built. This unit, which is shown in FIGURE 3 as a circle, is referred to as a storing pulse generator and is provided with a cocking terminal indicated by a line crossing the line towards this terminal, a firing terminal shown as an arrow pointing to the circle, and an output terminal shown as an arrow pointing away from the circle. The storing pulse generator is designed so that it delivers an output pulse after and only after a pulse is applied to its cocking terminal (cocking the pulse generator) and subsequently a pulse is applied to its firing terminal (firing the pulse generator). Consequently, a pulse generator which has not been cocked does not deliver an output pulse when fired, and a pulse generator which has been fired cannot again deliver an output pulse unless it is cocked again. A pulse generator may be provided with a plurality of firing terminals or a plurality of cocking terminals, as is shown in FIGURE 4. This pulse generator can be cocked by applying a cocking pulse to either of its cocking terminals and it can be fired by applying a firing pulse to other of its firing terminals. However, the pulse generator may alternatively be designed so that it passes to the cocked state when and only when pulses of certain value are simultaneously applied to both cocking terminals. This latter process is referred to as cocking in coincidence, whilst the two cocking terminals are referred to as coupled. The symbol for a pulse generator having two coupled cocking terminals is shown in FIGURE 5.

Figure 6:
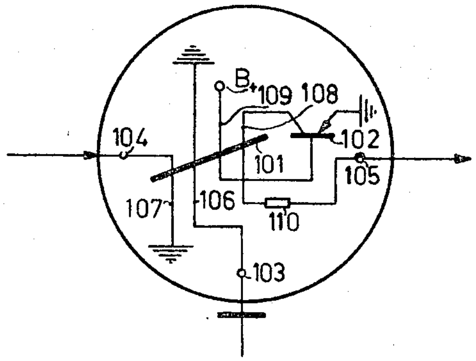
FIGURE 6 shows a possible embodiment of this unit.

FIGURE 6 shows the circuit diagram of a possible embodiment of a storing pulse generator. In this figure, reference numeral 101 denotes an annular core of magnetic material having a rectangular hysteresis loop, 102 a pnp-transistor, 103 a cocking terminal, 104 a firing terminal, 105 an output terminal, 106 a cocking winding on the core 101 connected to the cocking terminal 103, 107 a firing winding on the core 101 connected to the firing terminal 104, 108 a feedback winding on the core 101 one end of which is connected to the collector of the transistor 102 while the other end is connected, if required through a current-limiting resistor 110, to the output terminal 105, and 109 is a control winding on the core 101 connected at one end to a positive voltage source $B_+$ and at the other end to the base of the transistor 102. Each of the various windings may have more than one turn and need not consist of a wire passed once through the core 101. The winding senses of the various windings are shown in FIGURE 6 by the manner in which the lines concerned intersect the heavy line segment 101. The circuit arrangement shown in FIGURE 6 operates as follows. It is assumed that a current pulse of sufficient strength is applied to the cocking terminal 103. As a result, the ring 101 is magnetized in a certain circulating sense so that it reaches a state of magnetization referred to hereinafter as the state 1. If a pulse is then applied to the firing terminal 104, the ring 101 will begin to flip over to the state 0. As a result, in the control winding 109 a voltage is induced which overcomes the voltage of the positive voltage source $B_+$ so that the base of the transistor 102 is driven negative with respect to the emitter. Hence, the transistor becomes conductive so that current flows through the feedback winding 108 and the pulse generator delivers an output pulse. The current flowing through the feedback winding 108 may completely take over the effect of the current flowing through the firing terminal 104. Thus, when a cocked storing pulse amplifier is fired, its core is invariably set completely to the state 0, even if the firing pulse has ceased before the core 101 has reached the state 0. By proper proportioning it can be ensured that the pulse amplifier delivers output pulses the duration and amplitude of which are sharply defined, at least within certain limits. It will further be appreciated that the pulse generator may also be provided with two or more firing windings operating independently, which are each connected to a separate firing terminal. Similarly, the pulse generator may be provided with two or more cocking terminals each connected to a separate cocking winding. The assembly may be designed so that the pulse generator can be brought to the cocked state by applying a pulse to one of its cocking terminals, however, alternatively the pulse generator may be designed so that it is brought to the cocked state only by applying simultaneous pulses to two of its cocking terminals.

Figure 7:
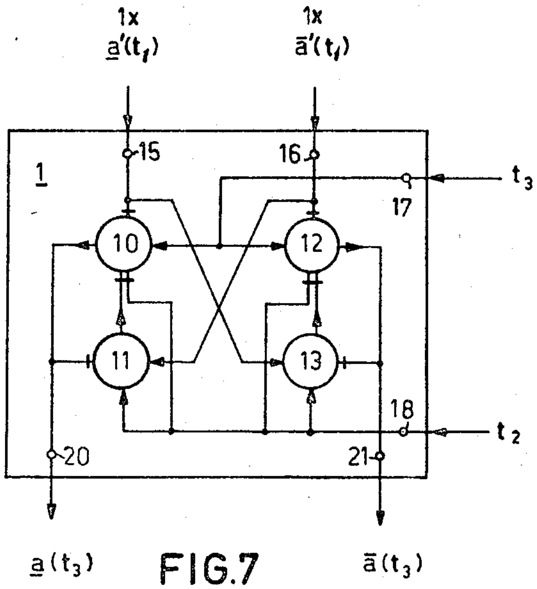

FIGURE 7 shows a possible embodiment of the circuit 1. The circuits 2, 3, 4 and 5 may be of the same design. The circuit arrangement shown in FIGURE 7 substantially comprises two pulse gates of the kind described in co-pending patent application Serial No. 75,365, filed December 12, 1960. The circuit comprises four storing pulse generators 10, 11, 12 and 13, two input terminals 15 and 16, two supply terminals 17 and 18 and two output terminals 20 and 21. The pairs of pulse generators 10, 11 and 12, 13 form pulse gates of the type described in the above-mentioned patent application. The input terminal 15 receives the non-recurrent signal $a'$, the input terminal 16 receives the non-recurrent signal $\bar{a}'$. It is assumed that these two signals occur only at the instant $t_1$ of a pulse cycle. The supply terminals 17 and 18 are connected to output terminals of a clock-pulse generator and receive clock pulses at the instants $t_3$ and $t_2$ of the pulse cycles. The various storing pulse generators are connected in the manner shown in FIGURE 7. The circuit operates as follows. It is assumed that at a certain instant the pulse generators 10 and 11 are in the non-cocked state. If now the input terminal 15 receives a non-recurrent pulse $a'$ at the instant $t_1$ of a pulse cycle, the storing pulse generator 10 is cocked. At the next instant $t_2$ the storing pulse amplifier 11 is fired but this has no further effect since, at this instant, this pulse generator is in the non-cocked condition. At the next instant $t_3$, however, the cocked storing pulse generator 10 is fired and delivers an output pulse which is also an output pulse of the circuit 1 as a whole. This output pulse is further used to bring the storing pulse generator 11 to the cocked condition. At the instant $t_2$ of the next pulse cycle the pulse generator 11 is fired so that the pulse generator 10 is cocked in coincidence. At the next instant $t_3$, the pulse generator 10 is again fired so that the circuit again delivers an output pulse and the pulse generator 11 is again cocked. This cycle of events is repeated indefinitely, in other words, the circuit 1 delivers a pulse train $a$ the pulses of which occur at the instants $t_3$ of the pulse cycles. Now let it be assumed that the input terminal 16 receives a non-recurrent pulse $\bar{a}'$ at the instant $t_1$ of a pulse cycle. Since this pulse is supplied to a firing terminal of the pulse generator 11, this pulse generator is fired and delivers an output pulse because it is in the cocked condition at the instant $t_1$. The output pulse delivered by the pulse generator 11, however, does not set the pulse generator 10 to the cocked condition, since in this case there is no coincidence at its coupled cocking terminals. Hence, the pulse generators 10 and 11 now both are in the non-cocked condition so that the circuit 1 no longer delivers output pulses at its output terminal 20. The pulse generators 12 and 13 fulfil the same functions with respect to non-recurrent pulses $\bar{a}'$ and $a'$ applied to the input terminals 16 and 15 as are fulfilled by the pulse generators 10 and 11 with respect to non-recurrent pulses $a'$ and $\bar{a}'$ applied to the input terminals 15 and 16.

Figure 8:
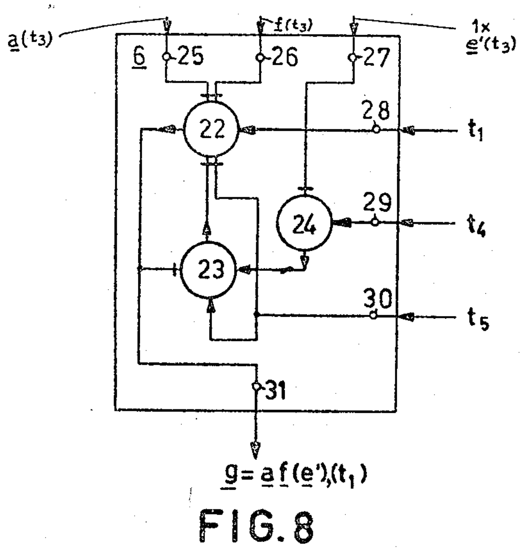

FIGURE 8 shows the circuit diagram of a possible embodiment of the logical circuit 6 in the circuit arrangement of FIGURE 2. This circuit comprises three storing pulse generators 22, 23 and 24 connected in the manner shown. The circuit further comprises three input terminals 25, 26 and 27, to which the pulse trains $a$ and $f$ and the pulse $e'$ are supplied, three supply terminals 28, 29 and 30, to which clock pulses are applied at the instants $t_1$, $t_4$ and $t_5$, and an output terminal 31 delivering the pulse train $g$. The pulse generators 22 and 23 together form a pulse gate of the same type as the pulse gates formed by the pulse generators 10, 11 and 12, 13 in the circuit arrangement shown in FIGURE 7.

The circuit operates as follows. It is assumed that at the instant $t_3$ of a pulse cycle, the pulse trains $a$ and $f$ are both present. The pulse generator 22 is then brought to the cocked state in coincidence. At the instant $t_1$ of the next pulse cycle, the pulse generator 22 is fired so that at the output terminal 31 of the circuit 6 a pulse $g$ is produced and the pulse generator 23 is brought to the cocked state. At the instant $t_5$ of the same pulse cycle, the pulse generator 23 is fired so that the pulse generator 22 is brought to the cocked state by coincidence. At the instant $t_1$ of the next pulse cycle, the pulse generator 22 is again fired, and so on. Thus, the circuit 6 now delivers a pulse train $g$ the pulses of which occur at the instant $t_1$ of the pulse cycles. If, however, the input terminal 27 receives a pulse $e'$ at the instant $t_3$ of a pulse cycle, the pulse generator 24 is brought to the cocked state thereby. At the instant $t_4$ of the same pulse cycle, the pulse generator 24 is fired. The resulting output pulse from the pulse generator 24 fires the pulse generator 23. Since at the instant $t_4$ this pulse generator is in the cocked state, it delivers an output pulse but this does not result in the pulse generator 22 being brought to the cocked state because there is no coincidence at its coupled cocking terminals. This means that the pulse train $g$ is broken off.

Figure 9:
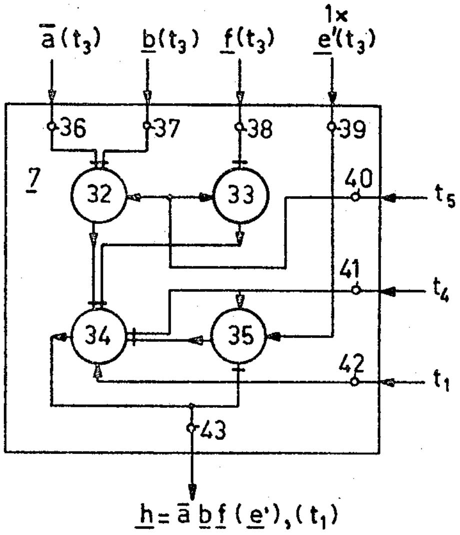

FIGURE 9 shows the circuit diagram of a possible embodiment of the the logical circuit 7 of the circuit arrangement shown in FIGURE 2. This circuit comprises four storing pulse generators 32, 33, 34, 35, four input terminals 36, 37, 38, 39, to which the pulse trains $\overline{a}$, $b$, $f$ and the pulse $e'$ are applied, three supply terminals 40, 41, 42, to which at the instants $t_5$, $t_4$ and $t_1$ of the pulse cycles clock pulses are applied, and an output terminal 43 at which the pulse train $h$ is produced. The pulse generators 34 and 35 together again constitute a pulse gate of the same type as described hereinbefore with reference to FIGURES 7 and 8.

The circuit arrangement operates as follows. It is assumed that at the instant $t_3$ of a pulse cycle, the input terminals 36, 37 and 38 each receive a pulse. As a result, the pulse generators 32 and 33 are brought to the cocked state. At the instant $t_5$ of the same pulse cycle these pulse generators are both fired and the output pulses delivered by these pulse generators bring the pulse generator 34 to the cocked state by coincidence. As a result, the pulse gate comprising the two pulse generators 34 and 35 is brought to the state in which it delivers a pulse train $h$. By the occurrence of a pulse $e'$ at an instant $t_3$, however, this pulse gate is again brought to the state in which it delivers no output pulses.

FIGURE 10 shows the circuit diagram of an embodiment of the logical circuit 8 in the circuit arrangement shown in FIGURE 2. This circuit has to realize the Boolean function:

$$k=\overline{a}\overline{b}cf(a+c')$$

However, the circuit arrangement shown in FIGURE 10 is based on the Boolean identity $$\overline{a}\overline{b}cf=\overline{a}.(\overline{b+\overline{c}+\overline{f}})$$

The circuit 8 substantially comprises five storing pulse generators 44, 45, 46, 47 and 48, the storing pulse generators 46 and 47 together again constituting a pulse gate of the above-described type. The circuit 8 further comprises six input terminals 49, 50, 51, 52, 53 and 54, to which the pulse trains $\overline{a}$, $b$, $\overline{c}$, $\overline{f}$, $a$ and the pulse $e'$ are applied, four supply terminals 55, 56, 57 and 58, to which at the instants $t_4$, $t_1$, $t_6$ and $t_5$ of the pulse cycles clock pulses are applied, and an output terminal 59 at which the pulse train $k$ appears.

The circuit arrangement operates as follows. It is assumed that at the instant $t_3$ of a pulse cycle the input terminal 49 receives a pulse, but that at this instant the input terminals 50, 51 and 52 do not receive an input pulse. This means that the signal $\overline{a}$ occurs but that none of the signals $b$, $\overline{c}$ or $\overline{f}$ are present, that is to say, that the signals $\overline{b}$, $c$ and $f$ are present. This results in that at the said instant $t_3$ the storing pulse generator 44 is brought to the cocked state, but that the storing pulse generator 45, which at the instant $t_1$ preceding the said instant $t_3$ was brought to the cocked state, is not fired and consequently remains in the cocked state. At the instant $t_6$ of the same pulse cycle the storing pulse generators 44 and 45 are both fired so that the storing pulse generator 46 is cocked in coincidence. As a result, however, the pulse gate formed by the two storing pulse generators 46 and 47 is again brought to the state in which a pulse train $k$ is produced at the the output terminal 59 of the logical circuit 8. If subsequently one of the terminals 53 or 54 receives a pulse, the storing pulse generator 48 is brought to the cocked state. This pulse generator is fired at an instant $t_4$ and the resulting output pulse brings the pulse gate comprising the pulse generators 46 and 47 to the state in which the pulse train $k$ is lo longer produced at the output terminal 59 of the circuit 8. If at the instant $t_3$ under consideration, the input terminal 49 should not have recived a pulse, the pulse generator 44 would not have been brought to the cocked state and the next instant $t_6$ the pulse generator 46 cannot be brought to the cocked state by coincidence, in other words, the pulse gate comprising the pulse generators 46 and 47 remains in the state in which the output terminal 59 delivers no pulse train $k$. The same applies if one of the terminals 50, 51 or 52 should have received a pulse at the said instant $t_3$. In this case, the pulse generator 45 would have been fired since it is in the cocked state at this instant, however, this firing cannot bring the pulse generator 46 to the cocked state because there is no coincidence at its cocking terminals. The pulse generator 46 cannot be brought to the cocked state at the instant $t_6$ because at this instant there cannot be coincidence at its cocking terminals since the pulse generator 45 has already been fired at the instant $t_3$ and consequently cannot again deliver an output pulse at the instant $t_6$.

This shows that when using the circuit arrangement shown in FIGURE 10 the signal $k$ is immediately broken off when the circuit receives the signal $a$ at its input terminal 53. This may be a disadvantage in some applications. Let it be assumed, for example, that each telegram is preceded by a certain address. In this case, the transmission of information by the source of information C might be interrupted in the middle of an address for the sake of a transmission of information by the source of information A. Thus, this address or at least part thereof might be lost. For this reason, in practice the circuit 8 is advantageously designed so that, although the information transmitted by the source C can be broken off at any point for the sake of a transmission of information by the source A, this breaking off can never take place in the middle of an address.

FIGURE 11 shows a circuit arrangement of logical circuit 8 which ensures that the addresses of all telegrams transmitted by the source of information C are always completely transmitted. The circuit contains a part which is substantially identical with the circuit shown in FIGURE 10. Elements of the circuit shown in FIGURE 11 corresponding with elements of the circuit of FIGURE 10 are designated by the same reference numerals. A difference from the circuit arrangement shown in FIGURE 10 consists in that the storing pulse generator 48 in the circuit arrangement of FIGURE 11 is cocked solely by the pulse $e'$ and not by pulses of the pulse train $a$. In the circuit of FIGURE 11 these latter pulses are applied to the firing terminal of a storing pulse generator 60 the output terminal of which is connected to a firing terminal of the pulse generator 47. The circuit further includes a counting circuit 61 having a first input terminal 62, which receives the pulses of the signal $k$ delivered by the pulse generator 46, a second input terminal 63, which receives the pulse $e'$ shifted by the pulse generator 48 to the instant $t_4$, and an output terminal 64 connected to the cocking terminal of the pulse generator 60. The counting circuit is designed so that it delivers an output pulse $p'$ after the reception of a certain number of pulses, for example four pulses of the signal $k$ at its first input terminal 62, which output pulse brings the pulse generator 60 to the cocked state, whilst by the reception of a pulse $e'$ at its second input terminal 63 the counting circuit is brought to the state in which it can again count a certain number of pulses of the signal $k$. It will be appreciated that the transmission of the signal $k$ now can only be broken off by the signal $k$ if the pulse generator 60 is in the cocked state, and this is the case only if the signal source C has transmitted at least four characters. Hence, in this case, the address must not exceed four characters, but it will be clear that the circuit can be adapted to addresses of any length by rendering the counting circuit 61 shorter or longer.

Figure 12:
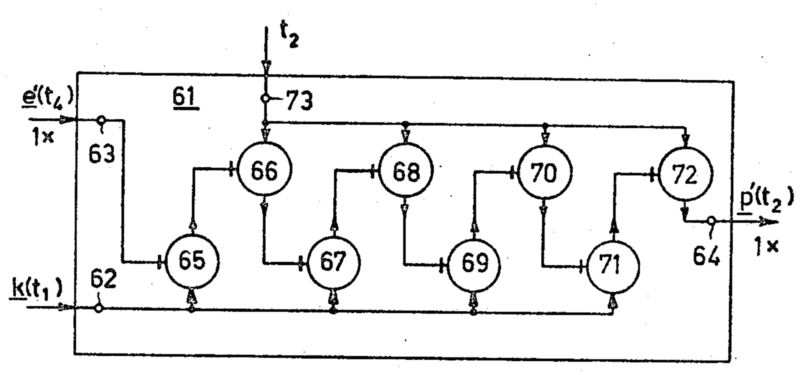

FIGURE 12 shows the circuit diagram of a counting circuit 61. This circuit substantially is a shift register of the "Wang line" type and is constituted by eight cascade-connected storing pulse generators 65, 66 . . . 72, each generator with the exception of the first being cocked by the output pulse of the preceding pulse generator. The output terminal of the final pulse generator 72 is connected to the output terminal 64 of the counting circuit as a whole. The cocking terminal of the first pulse generator 65 is connected to the input terminal 63 to which the pulse $e'$ is applied. The firing terminals of the pulse generators 65, 67, 69 and 71 are connected to the input terminal 62 to which the pulse train $k$ is supplied. The firing terminals of the pulse generators 66, 68, 70 and 72 are connected to a supply terminal 73 which receives clock pulses at the instants $t_2$ of the pulse cycles. The operation of this shift register can be readily deduced from FIGURE 12. When the pulse generator 65 is brought to the cocked state by a pulse $e'$, the shift register delivers an output pulse $p'$ at the instant $t_2$ of the pulse cycle in which it receives the fourth pulse of the pulse train $k$.

What is claimed is:

1. A transmission circuit comprising a plurality of signal sources connected to a common output transmission channel, and means for selectively permitting transmission by said signal sources, each of said signal sources having an output control signal means for providing an output control signal indicating the presence of information to be transmitted by the respective source, and input control signal means for receiving an input control signal for permitting transmission by the respective signal source, a separate logical circuit corresponding to each of said signal sources, each of said logical circuits having an output circuit connected to the input control signal means of the corresponding signal source, and input circuit means, said transmission channel comprising means providing a transmission control signal indicating the transmitting state of said channel, and means for applying to the input circuit means of each said logical circuit:

(a) said transmission control signal, (b) the output control signal of the corresponding signal source, and (c) the output control signals of higher priority signal sources, said logical circuits comprising means for providing an input control signal at their respective output circuits for permitting the initiation of transmission by the corresponding signal source only in the absence of output control signals indicating higher priority signal sources have information to be transmitted, in the absence of transmission control signals indicating another signal source is transmitting, and upon the occurrence of output control signals from the corresponding signal source indicating the presence of information to be transmitted.

2. A transmission circuit comprising a plurality of signal sources connected to a common output transmission channel and means for selectively permitting transmission by said signal sources, each of said signal sources having an output control signal means for providing an output control signal indicating the presence of information to be transmitted by the respective source, an input control signal means for receiving an input control signal for permitting transmission by the respective signal source, and an end of transmission signal means, means for detecting said end of transmission signals to provide an end of message signal, a separate logical circuit corresponding to each of said signal sources, each said logical circuit having an output circuit connected to the input control signal means of the corresponding signal source, and input circuit means, said transmission channel comprising means providing a transmission control signal indicating the transmitting state of said channel, and means for applying to the input circuit means of each said logical circuit:

(a) said transmission signal, (b) the output control signal of the corresponding signal source, (c) the end of message signal, and (d) the output control signals of higher priority signal sources, said logical circuits comprising means for providing an input control signal at their respective output circuits for permitting the initiation of transmission by the corresponding signal source only in the absence of output control signals indicating higher priority signal sources have information to be transmitted, in the absence of transmission control signals indicating another signal source is transmitting, and upon the occurrence of output control signals from the corresponding signal source indicating the presence of information to be transmitted, and at least one of said logical circuits comprising means for inhibiting transmission by the corresponding signal source upon the reception of a message end signal.

3. A transmission circuit comprising a plurality of signal sources connected to a common output transmission channel, and means for selectively permitting transmission by said signal sources, each of said signal sources having an output control signal means for providing an output control signal indicating the presence of information to be transmitted by the respective source, and input control signal means for receiving an input control signal for permitting transmission by the respective signal source, a separate logical circuit corresponding to each of said signal sources, each of said logical circuits having an output circuit connected to the input control signal means of the corresponding signal source, and input circuit means, said transmission channel comprising means providing a transmission control signal indicating the transmitting state of said channel and means for applying to the input circuit means of each said logical circuits:

(a) said transmission control signal, (b) the output control signal of the corresponding signal source, and (c) the output control signals of higher priority signal sources, said logical circuits comprising means for providing an input control signal at their respective output circuits for permitting the initiation of transmission by the corresponding signal source only in the absence of said transmission output signal indicating transmission by other signal sources, output control signals of other higher priority signal sources indicating information to be transmitted, and upon the occurrence of output control signals indicating the corresponding signal source contains information to be transmitted, at least one of said logical circuits comprising means for inhibiting transmission by the corresponding signal source upon the reception of an output control signal from a higher priority signal source indicating the presence of information to be transmitted.

4. A transmission circuit comprising a plurality of signal sources connected to a common output transmission channel, and means for selectively permitting transmission by said signal sources, each of said signal sources having an output control signal means for providing an output control signal indicating the presence of information to be transmitted by the respective source, and input control signal means for receiving an input control signal for permitting transmission by the respective signal source, a separate logical circuit corresponding to each of said signal sources, each of said logical circuits having an output circuit connected to the input control signal means of the corresponding signal source, and input circuit means, said transmission channel comprising means providing a transmission control signal indicating the transmitting state of said channel and means for applying to the input circuit means of each said logical circuit:

(a) said transmission control signal, (b) the output control signal of the corresponding signal source, and (c) the output control signals of higher priority signal source, said logical circuits comprising means for providing an input control signal at their respective output circuits for permitting the initiation of transmission of the corresponding signal source only in the absence of said transmission output signal indicating transmission by other signal sources, output control signals of other higher priority signal sources indicating information to be transmitted, and upon the occurrence of output control signals indicating the corresponding signal source contains information to be transmitted, at least one of said logical circuits comprising means for inhibiting transmission by the corresponding signal source upon the reception of an output control signal from a higher priority signal source indicating the presence of information to be transmitted, said means for inhibiting transmission being effective only after a predetermined time following the initiating of a signal transmission.

5. A signal transmitting circuit comprising a plurality of signal sources connected to a common output transmission channel, and means for selectively permitting transmission by said sources, said signal sources each comprising means providing a first control signal indicating the respective source is prepared to transmit signals, means responsive to a second control signal for permitting the respective source to transmit information to said channel, and means indicating the end of a signal message, said transmission channel comprising means for providing a third control signal upon the passage of signals thereto from said sources, and means for providing a fourth control signal upon the reception of an end of message signal from a signal source, said means for selectively permitting transmission comprising a separate logical circuit corresponding to each of said signal sources, each logical circuit having a first input terminal connected to receive the first control signal of the corresponding signal source, second and third input terminals connected to receive said third and fourth control signals, respectively, and an output terminal connected to apply said second control signal to the corresponding signal source, said logical circuit being responsive to the simultaneous occurrence of at least signals at said first and second input terminals for initiating said second control signal at said output terminal, and being responsive to at least the occurrence of signals at said third input terminal for stopping said second signal at said output terminal.

References Cited by the Examiner

UNITED STATES PATENTS

| | | | |
|---|---|---|---|
| 2,935,627 | 5/60 | Schneider | 179—27.1 |
| 3,007,136 | 10/61 | Tyrlick | 340—147 |
| 3,066,192 | 11/62 | Bartlett et al. | 179—18.9 |

NEIL C. READ, *Primary Examiner.*